United States Patent [19]

Kiowski

[11] 3,739,374

[45] June 12, 1973

[54] DIGITAL SWEEP GENERATOR FOR GENERATING ANALOG SIGNALS

[75] Inventor: John W. Kiowski, Houston, Tex.

[73] Assignee: Mandrel Industries, Inc., Houston, Tex.

[22] Filed: Aug. 27, 1971

[21] Appl. No.: 175,472

[52] U.S. Cl. ........... 340/347 DA, 307/271, 331/178 235/197

[51] Int. Cl. .......................... H03b 23/00

[58] Field of Search .......................... 307/228, 271; 235/197; 325/335; 340/347 DA; 235/92 FQ, 197; 331/177 R, 178, 179

[56] References Cited

UNITED STATES PATENTS

| | | | |
|---|---|---|---|
| 3,331,035 | 7/1967 | Strickholm | 331/178 |
| 3,530,404 | 9/1970 | Abruzz et al. | 331/178 |
| 3,633,017 | 1/1972 | Crooke et al. | 235/197 |
| 3,648,037 | 3/1972 | Tew, Jr. | 235/197 |

*Primary Examiner*—Thomas A. Robinson
*Assistant Examiner*—Leo H. Boudreau
*Attorney*—Robert G. Clay

[57] ABSTRACT

A digital sweep generator for digitally generating an analog since wave signal of constant or varying (sweep) frequency, includes means for generating a rate-of-change clock, a slope clock and a sine function, via digital circuits. The rate-of-change clock determines the rate-of-change in the frequency of a sinewave across a desired range of frequencies for a given time interval. The slope clock occurs at the exact increments selected to produce a given sinewave frequency as determined by the rate-of-change clock. That is, if a sweep sinewave signal is desired, the rate-of-change clock is introduced to modify accordingly the means for generating the slope clock. The slope clock is then introduced to the means for generating a sine function to digitally produce the sinewave signal as the function of the input slope clock rate. Each slope clock represents a point on the slope of the generated sinewave, corresponding to equal increments of 360° of a sinewave. Two outputs are provided; a digital word corresponding to the sinewave, and the analog sinewave signal delivered therefrom via a digital-to-analog converter.

11 Claims, 6 Drawing Figures

INVENTOR.
JOHN W. KIOWSKI

BY Robert G. Clay
ATTORNEY

Patented June 12, 1973 3,739,374

5 Sheets-Sheet 2

INVENTOR.
JOHN W. KIOWSKI

BY Robert H. Clay
ATTORNEY

Patented June 12, 1973 3,739,374

5 Sheets-Sheet 3

INVENTOR.
JOHN W. KIOWSKI

BY Robert H. Clay
ATTORNEY

INVENTOR.
JOHN W. KIOWSKI

BY Robert H. Clay

ATTORNEY

INVENTOR
JOHN W. KIOWSKI

BY *Robert H. Clay*

ATTORNEY

DIGITAL SWEEP GENERATOR FOR GENERATING ANALOG SIGNALS

BACKGROUND OF THE INVENTION

1. Field

The present invention relates to signal generators and particularly to a digital circuit for generating an analog signal that sweeps from one cycle to a large multiple of cycles, over a selectable time period extending through a plurality of seconds.

2. Prior Art

Various prior art analog devices are available for generating seismic sweep signals for use in operating variable, seismic signal generators. Typical of such prior art are rotating drum tape recorders wherein the analog sweep is recorded on the drum. One revolution of the drum during operation provides a sweep signal, which is fed to associated vibrator trucks via radio transmission links. However, in high speed seismic operations, a continuous mode is utilized, and accordingly, continuous radio transmission is likewise required, which is an undesirable operating condition. Additionally, such analog devices inherently generate signals having flutter, high distortion, and high repeatable error sweep signals.

Typical of digital prior art devices for generating a variable frequency sweep are those utilizing a prerecorded library tape, wherein the sweep is digitized via a computer and is then stored on the tape. In operation, the sweep is fed from the tape to a core memory and thence to the vibrator truck or trucks. In one form, the sweep is transmitted via radio as in the analog device mentioned above, with the same problems of continuous radio transmission, etc. In another form of equipment, a separate core memory may be placed in each vibrator truck, and the cores are then keyed by means of the radio transmission links. However, this requires very precise keying in order to unload the cores at precisely the same time; i.e., to initiate operation of the vibrator sources in synchronism. Furthermore, it is necessary to overcome the problem of loading a desired sweep signal into the core memory of each truck. In addition, the use of the plurality of core memories is prohibitively expensive.

SUMMARY OF THE INVENTION

The present invention overcomes the shortcomings of the prior art by employing a digital circuit for generating a variable frequency analog sweep signal locally at each vibrator truck, utilizing relatively inexpensive logic circuits. To this end, a master oscillator generates a pair of master clocks, herein termed an "interval register" clock and a "time period register" clock, respectively. The clocks are fed to a rate-of-change clock generator and a slope clock generator, respectively. The number of cycles to be swept thru (the range) may be determined by the digital subtraction of the start frequency of the sweep from the stop frequency of the sweep, or, to save logic may be entered directly as a binary number by the operator. The resulting "range input" is delivered to a divide logic and interval register along with a time input corresponding to the selected time duration of the desired sweep. Via digital logic, the range is divided into the time of the sweep, multiplied by the interval register clock and by the resolution. The resulting rate-of-change clock is introduced to a frequency register of the slope clock generator, wherein the latter clock determines the time interval at which the frequency register is advanced, thus correspondingly increasing the rate the slope counter advances as discussed below. The period of the rate-of-change clock is proportional to the number of increments within the frequency register which are required to sweep from the start to the end frequency of the analog sine wave signal.

The slope clock generator employs a time period register and associated divide logic and, utilizing the register clocking rate as a time base, multiplies same by the number of increments or locations per cycle of the sinewave, as selected. The result of the multiplication is divided by the frequency of the frequency register to which the rate-of-change clock is introduced, to provide the slope clock which occurs at exact intervals necessary to produce a given sinewave frequency, i.e., the slope clock rate is based on the binary number of the frequency register.

The resulting slope clock is introduced to the digital sine function generator and occurs a number of times faster than the time period of the frequency required, wherein the number of times is equal to the selected number of increments or locations in each cycle of the sinewave. The slope clocks advance a binary counter that digitally produces each of the number of increments in the sinewave. A read only memory contains the sine functions from 0°–90°, in a selected number of locations depending upon the resolution required. The slope counter addresses each of the locations sequentially. The addresses necessary to access the sine function from 91°–180° are obtained by complementing the counter. The next 180° are obtained by repeating the above steps,. The counter is again complemented to access the sine function from 271°–360°.

The digital word for the sinewave, generated via the sine function generator, is introduced to a digital-to-analog converter to provide the analog sweep signal in accordance with the invention.

DESCRIPTION OF THE PREFERRED EMBODIMENTS

Figures 1, 5:
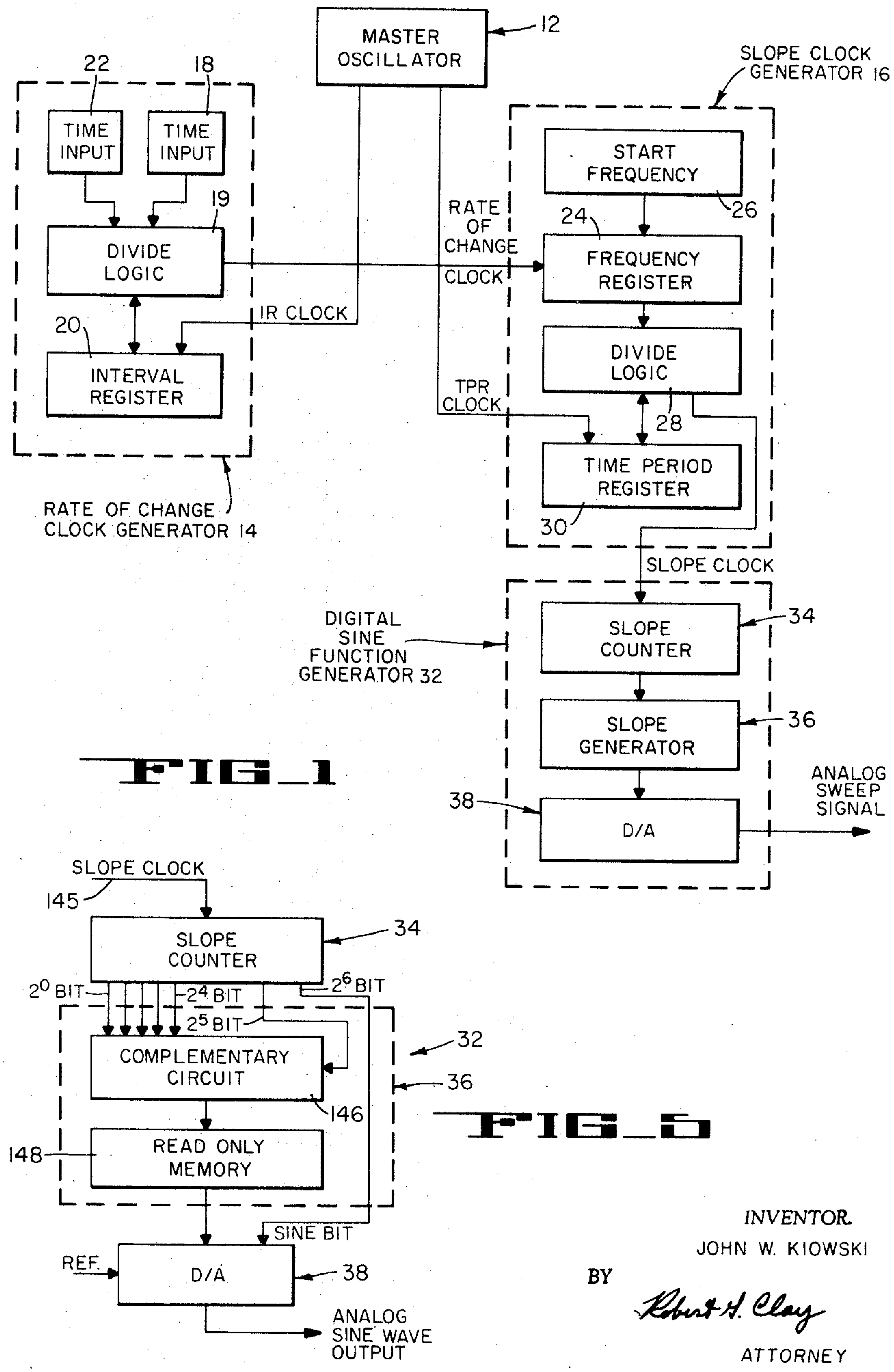
FIG. 1 is a block diagram illustrating the invention combination.
FIG. 5 is a block diagram illustrating embodiment of a digital sine function generator of the invention.

Referring to FIG. 1, master oscillator means 12 introduces a pair of selected master clock inputs, herein identified as the interval register (IR) clock and the time period register (TPR) clock, to rate-of-change clock generator means 14, and to slope clock generator means 16, respectively. The generator means 14 includes range input means 18 for determining the number of cycles to be swept thru (range). The range input is introduced to divide logic means 19, which in turn couples to an interval register 20. The time duration of the sweep is also delivered to the divide logic means 19 via a time input circuit 22. The range is divided into the time of the sweep multiplied by the IR frequency, i.e., the clock rate received from the master oscillator means 12 and by the resolution by means of the divide logic 19 and the interval register 20, as further described in FIG. 3. Resolution greater than, or less than, one cycle requires an associated division or multiplication by the resolution number.

The resulting rate-of-change clock is introduced to a frequency register 24 of the slope clock generator means 16. Start frequency means 26 is coupled to the frequency register 24 and provides a start frequency. A binary number which represents the TPR clock from the master oscillator 12, multiplied by the number of increments or locations selected in each cycle of the sinewave is divided by the frequency of the frequency register 24 to produce the slope clock pulse. By way of description only, in the sweep generator described herein, the frequency of the frequency register 24 corresponds to, i.e., is modified by, the rate-of-change clock introduced from the rate-of-change clock generator means 14. A constant frequency sinewave output may be generated rather than a sweep, if frequency register 24 remains unchanged.

The division of the TPR clock frequency to produce the slope clock pulse is accomplished by continuously adding the complemented binary number (subtraction) in frequency register 24 to the binary number in the TPR register 30. The subtraction of the two numbers is performed by divide logic 28. When the number in frequency register 24 has been subtracted a sufficient number of times to cause the time period register 30 to go negative on the next TPR clock, a pulse representing the slope clock is gated out the carry line to a slope counter 34 of a digital sine function generator means 32. At the next clock time the time period register 30 overflows, creating a binary number equal to the positive remainder before overflow, plus 4,096, minus the contents of the frequency register 24.

The slope clock occurs a number of times faster than the time period of the frequency required, wherein the number of times selected is equal to the selected increments in one cycle of the sinewave output. The slope clocks advance the slope counter 34, which digitally produces each of the number of points in the sinewave. As previously mentioned, the resolution desired determines how many increments per cycle is generated. The counter state is fed to a slope generator 36 which is a logic matrix that outputs the sine functions from 0° to 180° in a binary word. The slope generator 36 plus the most significant bit of the slope counter (sine bit) outputs to a digital-to-analog converter 38, to convert the digital word output to an analog voltage which corresponds to the amplitude of the analog sinewave or sweep signal desired.

By way of example only, the schematic diagrams of specific logic circuits for implementing the master oscillator 12, the rate-of-change clock generator means 14, the slope clock generator means 16, and the digital sine function generator means 32, are illustrated herein in FIGS. 2–6 respectively. However, various modifications and/or replacement of specific logic circuits, may be made in accordance with the invention combination, to perform functions required in specific applications of the digital sweep generator. For example, the means for providing a taper at either end of the sweep signal includes apparatus shown, for example, in FIG. 6 below. On the other hand, if a constant frequency analog sinewave output is desired, the rate-of-change clock generator means 14 may be turned off, whereby the frequency register 24 is operated at a constant, selected frequency rather than being regulated by the rate-of-change clock from generator means 14. It follows that if a set frequency is input to the frequency register 24 as, for example, via pre-set thumbwheel inputs, the combination of the slope clock generators means 16 and the digital sine function generator means 32, provides a very accurate digital oscillator circuit for general use in various electronic fields.

Figure 2:
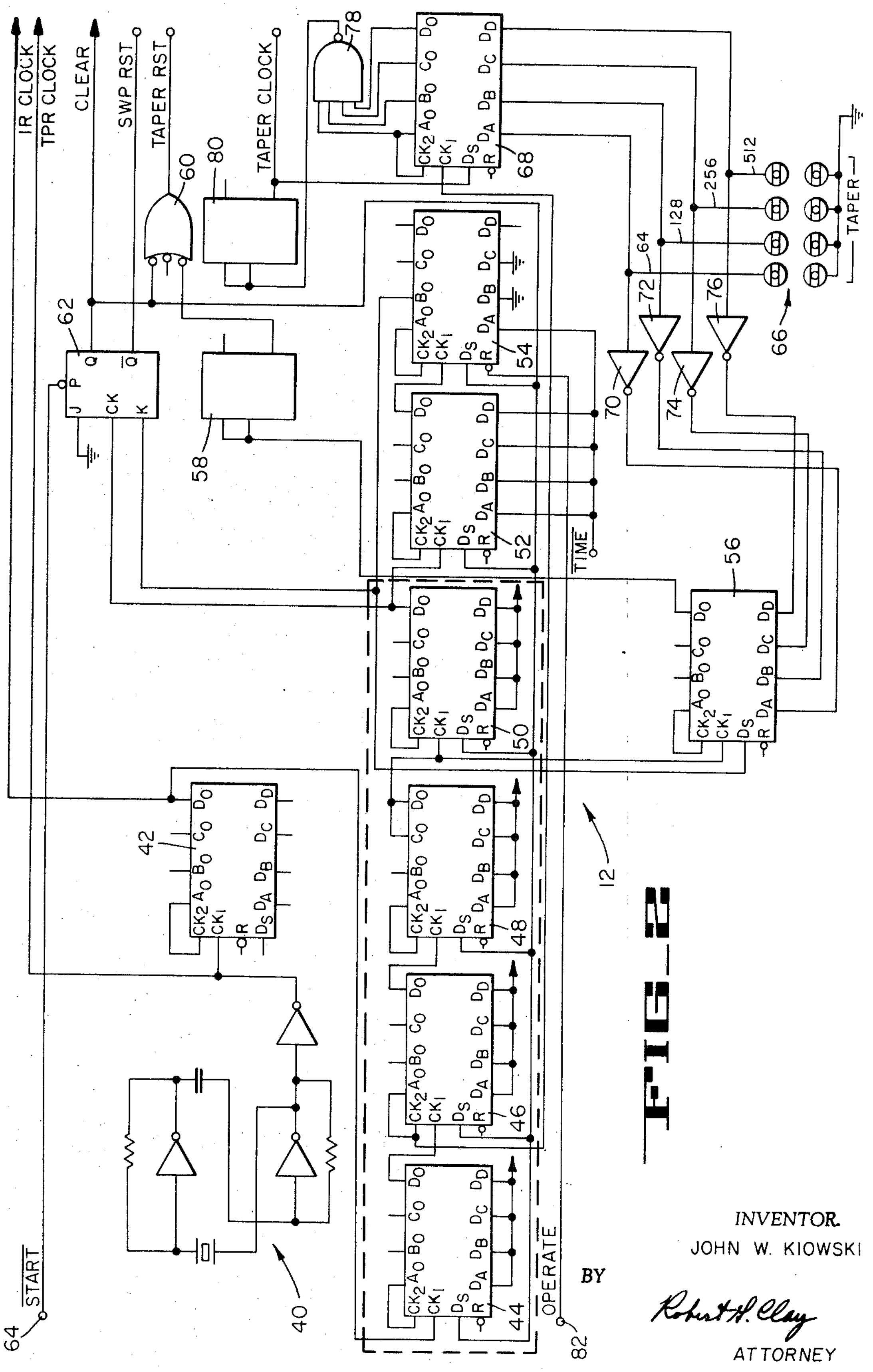
FIGS. 2–4 are schematic diagrams of specific portions of the invention combination of FIG. 1.

Referring now to FIG. 2, there is illustrated in greater detail one embodiment of the master oscillator 12 of FIG. 1. Crystal oscillator means 40 provides a preselected clock at 524.288 kHz, which comprises the time period register (TPR) clock of previous mention. The TPR clock is fed to a countdown divider means 42 which divides down by 16 to provide the interval register (IR) clock of previous mention at 32.768 kHz. The IR clock is also fed to a series of counters 44 thru 50 which divide the clock by 32,768 creating a 1 second clock. The count begins when the start flip-flop 62 is set removing the reset inputs to counters 44 thru 50. A time input is introduced to the counters 52 and 54 and provides a means for manually setting the time duration of the sweep signal. That is, the counters 52 and 54 are used to count time and are set, for example, at 8 to provide a 9 second sweep. When the counters count up to the all "ones" state the next clock causes the $B_0$ output of counter 54 to enable the counter 56 (which already has the taper return duration setting) to start counting. When the $D_0$ output of counter 56 goes low it in turn triggers a one shot 58. "OR" gate 60 passes this pulse (or an input from flip-flop 62) to reset the taper. The start flip-flop 62 is set by a start input 64 and resets at the end of the next 1 second clock after the 54 $B_0$ output is high.

A binary taper input 66 is coupled to counter 68 and also counter 56 by respective inverter circuits 70 through 76. A NAND gate 78 is coupled to the outputs of counter 68 and then to one shot 80, which provides a taper clock output. Counter 68 starts counting from the taper input information and counts to an all "ones" state. All "ones" into NAND gate 78 triggers one shot 80 to provide a taper clock, and pre-sets counter 68 back to the taper input state. In operation an operate input 82 is delivered to the time counter 54 allowing it to count, while start input 64 is delivered to the start flip-flop 62.

Figure 3:
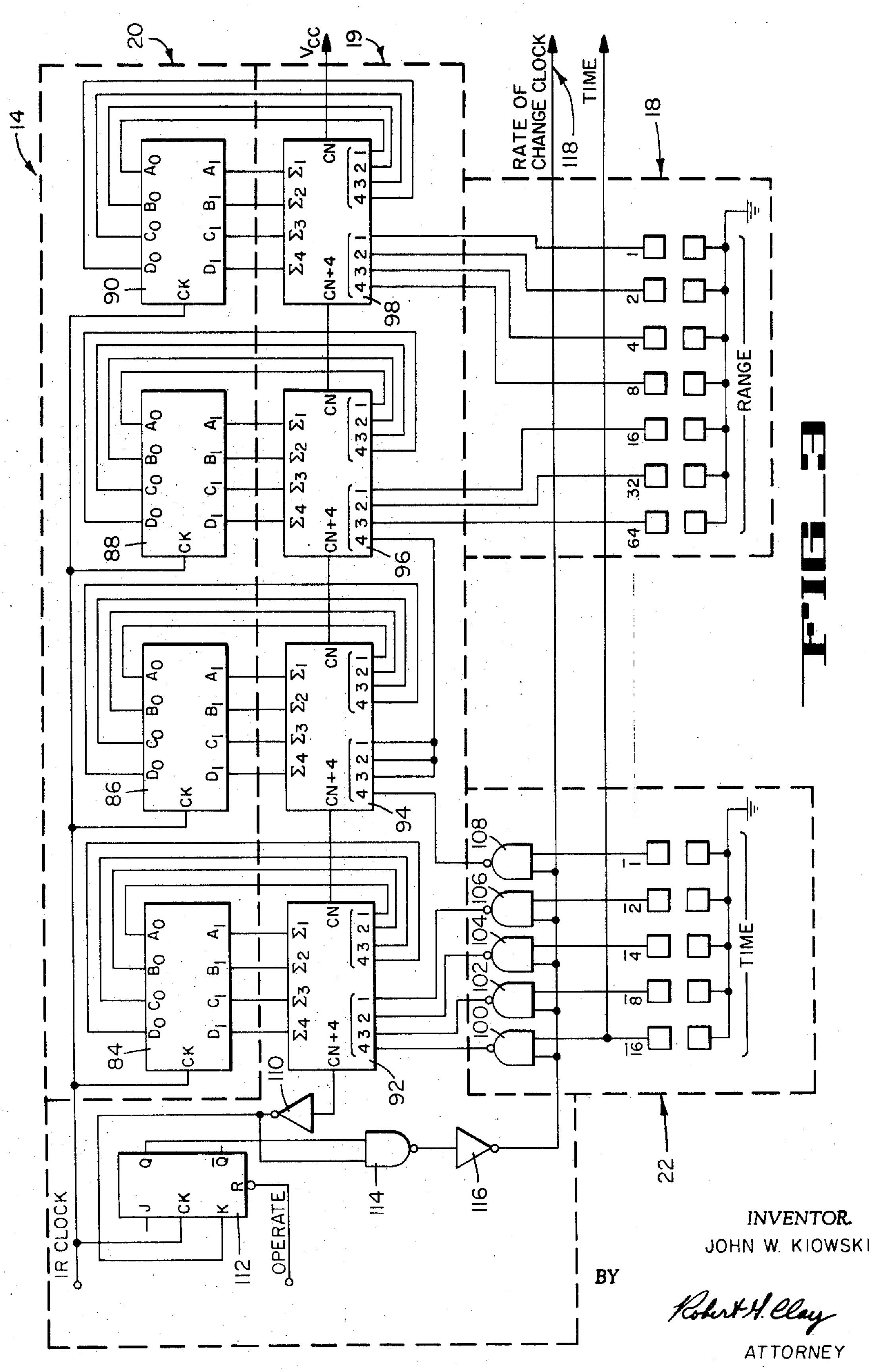

Referring to FIG. 3, there is shown in greater detail the rate-of-change clock generator means 14 including the range input means 18, the time input means 22, the divide logic 19 and the interval register 20 of previous mention. The interval register 20 includes a series of storage registers 84–90, while the divide logic includes a like series of adders 92–98. The range input means 18 is coupled to the adders 96, 98, while the time input means 22 is coupled to the adders 92, 94, via one input of a series of NAND gates 100–108.

Registers 84–90 of the interval register 20 are coupled to respective adders 92–98 of the divide logic 19. Division of the time product stored in the interval register 14 is accomplished by repeatedly subtracting the range input by use of the adders of the divide logic 19. Inverter circuit 110 is coupled to adder 92 and thence to a load inhibit flip-flop 112, and to a NAND gate 114. Flip-flop 112 provides the second input to the NAND gate 114. An inverter circuit 116 is coupled from NAND gate 114 to the second inputs of the series of NAND gates 100-108. The output from inverter circuit 116 is also delivered from the rate-of-change clock generator means 14 as the rate-of-change clock, as indicated at numeral 118.

In operation, the logic circuits of FIG. 3 provide means for implementing the equation $$\text{Rate-of-change clock} = \frac{\text{IR frequency} \times \text{time} \times \text{resolution}}{\text{range}}$$

wherein range equals $f_1$ (high frequency) $- f_2$ (low frequency) corresponding to the start and the stop frequencies, and IR frequency is a binary number equal to the IR clock rate.

That is, the rate-of-change clock generator means 14 provides logic for digitally dividing the range into the time product (time interval of the sweep, multiplied by the IR clock, multiplied by the resolution). Accordingly, the register clocking rate (IR clock) is used as a "time base" in the multiplication, wherein a resolution higher or lower than one cycle requires a respective division or multiplication process by the resolution number. For example, if a 2-cycle resolution is desirable, the IR frequency and time are divided by two to provide the higher resolution.

Logically, the time input is multiplied by the IR frequency, and the quotient is stored in the interval register 20. This is provided via the load inhibit flip-flop 112 and the carry out via inverter 110 which enables NAND gate 114, and thence time input gates 100–108. Utilizing the IR clock, the binary values of the range input are subtracted a sufficient number of times to provide a successively smaller number in the interval register 20. At some time interval after the initial state of the interval register 20, the remainder therein will be less than the binary number of the range input. Thereupon the divide logic 19 produces a zero carry-out pulse via inverter circuit 110 which again loads the time input multiplied by the IR frequency into the interval register 14 on the next clock. On the clock following the zero carry the load inhibit flip-flop 112 is set, gate 114 is inhibited, which in turn inhibits the time input gates 100-108. This presents a time input to the divide logic 19 after generation of a rate-of-change clock via 118.

Accordingly, the time interval of adder 92 going low determines to the rate-of-change clock of previous mention. This is delivered by the generator means 14 to correspondingly regulate the clocking rate of the frequency register 24 of slope generator means 16, thus providing a linearly increasing or decreasing binary number in the frequency register.

Figure 4:
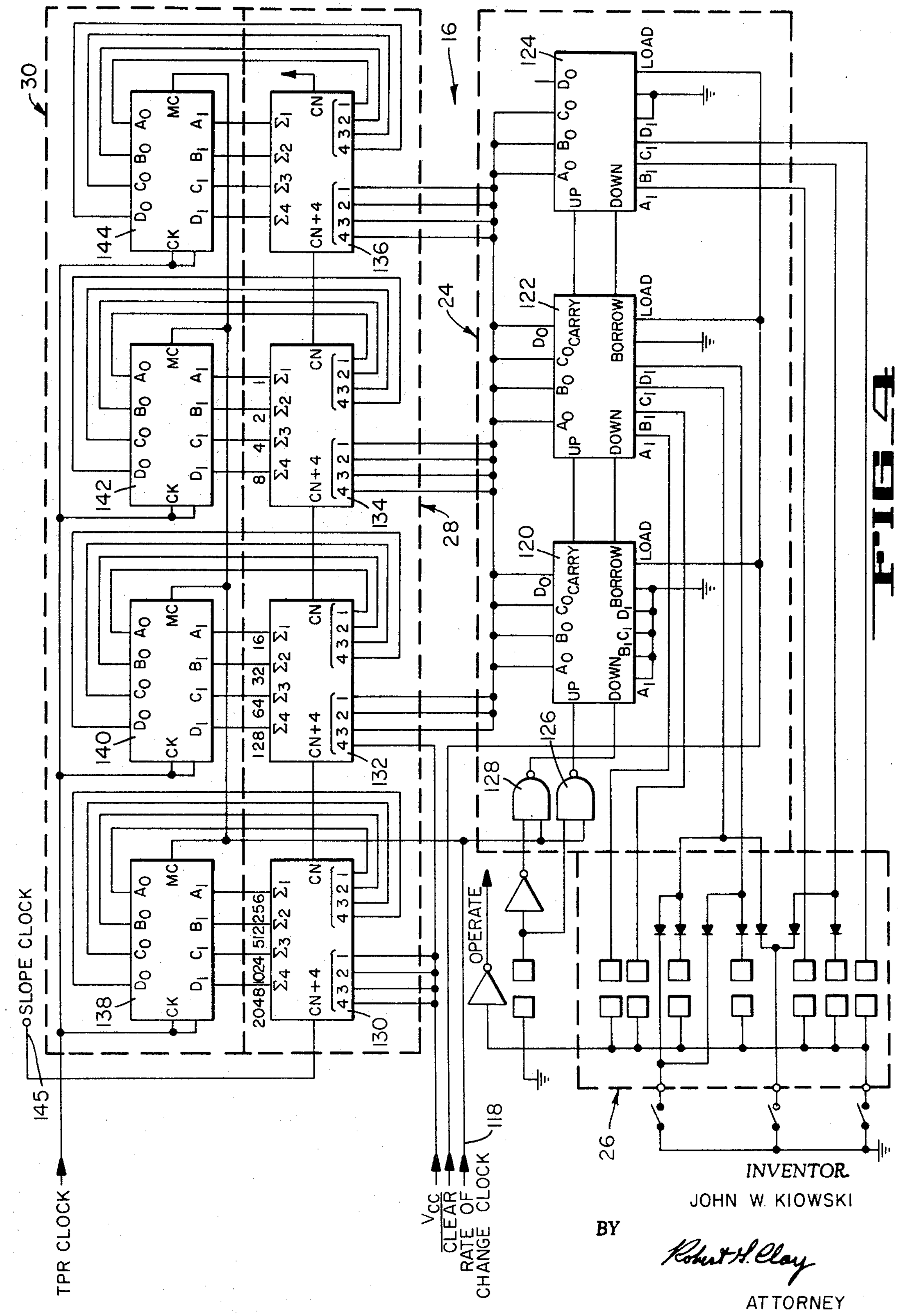

Referring now to FIG. 4, there is shown the slope clock generator means 16 of FIG. 1, including the start frequency means 26, the frequency register 24, the divide logic 28, and the time period register 30 of previous mention. The frequency register 24 includes sequentially coupled up/down counters 120–124 controlled by up and down AND gates 126, 128. The rate-of-change clock is introduced as one input to the AND gates 126, 128. The other input enables gate 128 for a down sweep and gate 126 for an up sweep. The start frequency means 26 outputs are delivered to the up/down counter 122, 124. A "clear" input is also introduced to store the start frequency in the up/down counters 120–124. The outputs are introduced to adders 132–136, of a series of adders 130–136 which form the divide logic 28.

The adders 130–136 are in turn coupled to a series of storage registers 138–144 which comprise the time period register 30 of FIG. 1. The TPR clock is introduced to the registers 138–144 to provide the store clock for the time period register 30.

In operation, the logic circuits of FIG. 4 provide digital means for implementing the equation $$\text{Slope clock} = \frac{\text{TPR frequency} \times \text{increments per cycle of sinewave}}{\text{frequency within register 24}}$$

wherein the TPR frequency is a binary number equal to the TPR clock rate.

Figure 6:
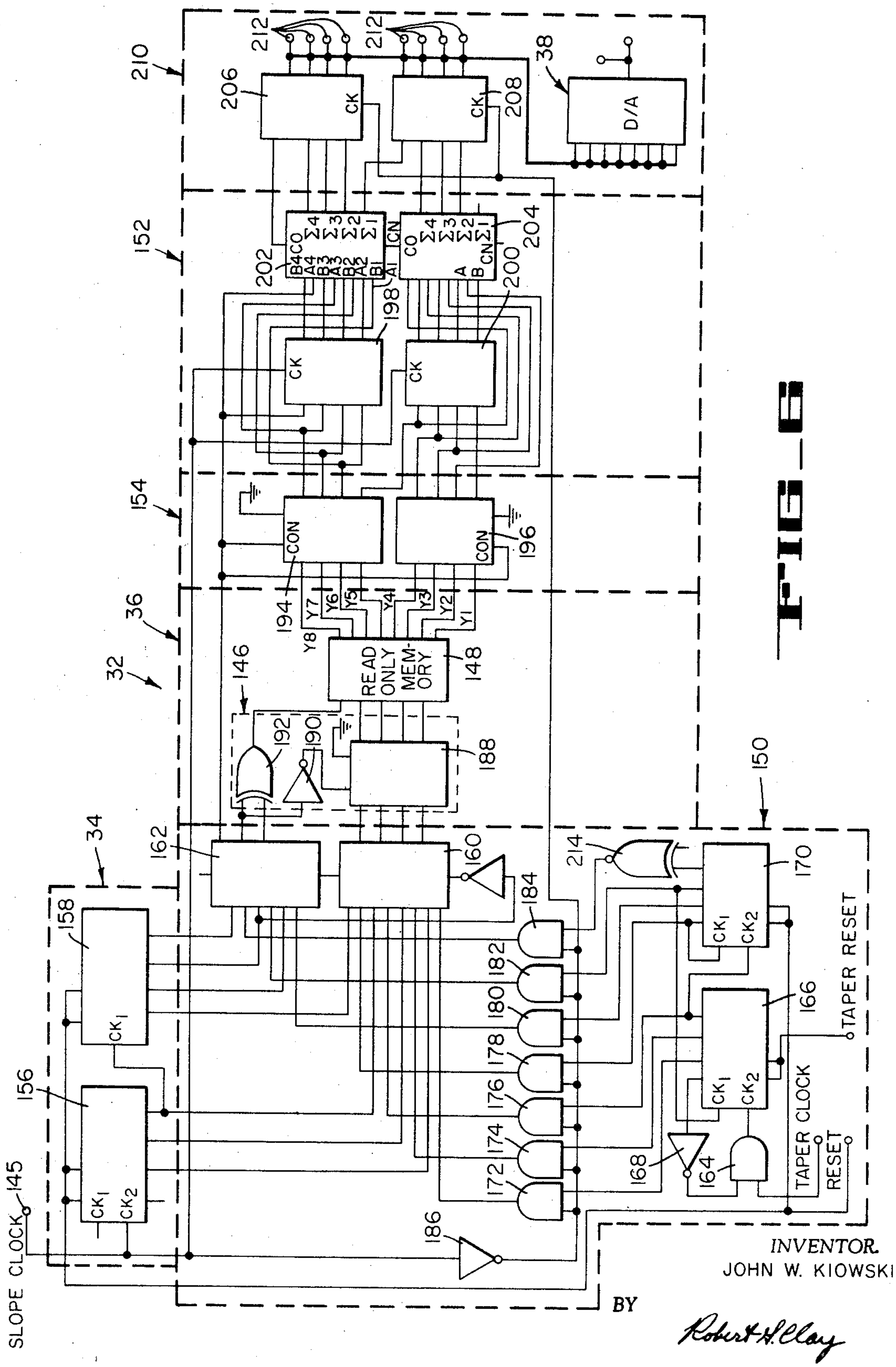
FIG. 6 is a schematic diagram depicting in further detail the circuit of FIG. 5.

To this end, the binary number in the frequency register 24 is divided into the TPR clock rate (frequency) by continuous addition of frequency as a complemented binary number. When the number in the frequency register 24 has been subtracted a sufficient number of times to cause the time period register 30 to go negative on the next TPR clock, a zero carry-out pulse is gated out the carry line from adder 130, for subsequent introduction to the slope counter 34 of the generator means 32 (FIGS. 1, 5, 6). The pulse gated out the carry line (indicated at numeral 145) comprises the slope clock of previous mention. That is, when the remainder in the time period register 30 is less than the frequency register 24, the carry out goes to ground which produces the slope clock at 145. At the next TPR clock time the time period register 30 overflows, creating a binary number equal to the positive remainder before overflow, plus 4,096, minus the contents of the frequency register 24.

Referring now to FIG. 5, there is shown in further block diagram, the digital sine function generator means 32 of FIG. 1, which may provide a constant frequency sinewave or a sweep signal of selected range and time duration. The circuit may further be modified as in FIG. 6 to provide means for tapering the sinewave output. A tapered sweep signal is particularly useful in driving a seismic source.

To this end, referring to FIG. 5, the slope clock of previous mention is delivered via 145 to the slope counter 34, whose outputs in turn are introduced to the slope generator 36. More particularly, the slope counter outputs are introduced to a complementary circuit 146, which outputs in turn to a read only memory 148. The read only memory 148 is coupled via invert logic integral therewith (shown in detail in FIG. 6), to the digital-to-analog converter 38 which provides an analog sinewave output (e.g., the analog sweep signal of FIG. 1).

As indicated in FIG. 5, the $2^0$ bit through the $2^4$ bit addresses the sine function from 0° to 90° which is stored in the read only memory 148. The $2^5$ bit provides the address to access the sine function from 91° to 180° by complementing the slope counter 34, while the $2^6$ bit is the sine bit delivered to the invert logic and the digital-to-analog converter 38 to access the sine function from 181° to 360°, as further described below.

More particularly, in operation, the sine function is generated via generator means 32 by addressing the read only memory 138 which contains the sine function from 0° to 90° in a selected number of locations, depending upon the resolution required. The slope counter 34 is used to sequentially address each location from 0° thru 90° via the first 5 bits. The addresses necessary to access the sine function from 91° thru 180° are obtained by complementing the counter 34 via the 6th bit. The counting sequence is repeated without the complement for the sine function from 181° thru 270°, wherein the sine (7th) bit indicates the opposite polarity of the sinewave. The slope counter 34 is again complemented in combination with the sine bit to access the sine function from 271° thru 360°. The resulting output is a digital word representing one cycle of the sinewave which, when introduced to the digital-to-analog converter 38, provides the analog sinewave output of the invention. Note the slope clock frequency is faster than the desired analog frequency of the output, by a number equal to the number of locations selected per cycle of the sinewave. Accordingly, by way of example only, the read only memory 148 contains the sine function from 0° to 90° in 0 to 31 locations. The slope counter 34 addresses each of these locations from 0 to 31, whereupon the logic complements the 5 bit address and as the slope counter 34 continues to count up, the address counts down from 31 to 0. Thus, to this point, the read only memory 148 creates the digital word for 180° of a sinewave. As previously mentioned the next 180° are obtained by repeating the above steps but with the sine bit complemented.

FIG. 6 shows in greater detail the digital sine function generator means 32 of FIG. 5, further including digital logic for providing a taper at either end of the sweep signal. Accordingly, referring to FIG. 6, there is shown the slope counter 34, the slope generator 36, and the digital-to-analog converter 38 of previous mention in FIG. 1, and particularly in FIG. 5. In addition, there is shown the taper generating logic of previous mention, which comprises a taper logic circuit 150 and a taper generator 152. In addition an invert operation logic 154 provides the complementing operation capability as further discussed below.

If a taper is not desired on the sweep signal generated by the invention sweep generator, the taper logic circuit 150 and the taper generator 152 may be omitted, with the output from the slope counter 34 fed directly to the complementary circuit 146 of the slope generator 36. The output of the read only memory 148 is then fed directly to the digital-to-analog converter 38 to provide the analog sweep signal.

The slope counter 34 includes a pair of counters 156, 158, wherein counter 156 is coupled to the slope clock introduced from the divide logic 28 of the slope clock generator means 16. The counters 156, 158 are also coupled to the reset pulse input introduced from the start flip-flop 62 (FIG. 2) of previous mention. The outputs from the counters 156, 158 are introduced to adders 160, 162, respectively. A taper clock introduced from flip-flop 80 of FIG. 2 is fed to an AND gate 164 whose output is delivered to a counter 166. The output line from the counter 166 is fed via inverter circuit 168, to provide the other input to the AND gate 164. The taper reset pulse is introduced to the counter 166 from the master oscillator 12 of FIG. 2. The reset pulse is delivered to a second counter 170, wherein the outputs from the counter 166, 170 are delivered to the first inputs of a series of taper logic AND gates 172–184. The second inputs to the AND gates 172–184 are provided via an inverter circuit 186 coupled to the slope clock 145. The outputs from the AND gates 172– 178 and gates 180–184 are introduced to the counters 160 and 162 respectively along with respective outputs from the counters 156, 158.

The output from adders 160, 162 are delivered to the complementary circuit 146, which includes a true/complement logic chip 188, an inverter circuit 190 and an exclusive "OR" gate 192. The output from the counter 188 and gate 192 are delivered to the read only memory 148. The logic chip 188 is the type which provides a sine function which is "true" when the control input thereto is high.

The invert operation logic 154 includes a pair of true/complement logic chips 194, 196, which are coupled to the output of the read only memory 148. The function of the unipolar operation logic 154 is to invert the sine function from the read only memory 148 to provide the proper digital word to the digital-to-analog converter 38; i.e., operation in inverted polarity. The outputs from the logic chips 194, 196, are introduced to registers 198, 200 and thence to adders 202, 204 of the taper generator 152. The slope clock is introduced to the registers 198, 200. A sine bit input is introduced from adder 162 to the logic chips 194, 196, the register 198 and the adder 202. Outputs from the adders 202, 204 are used to address a pair of holding registers 206, 208 of a slope register 210, which is shown herein as including the digital-to-analog converter 38. The digital word outputs from the registers 206, 208 are supplied at 212 and are also introduced to the digital-to-analog converter 38 to provide the analog sweep signal in accordance with the invention.

In operation, the generation of the taper at either end of the analog sweep contemplates the use of the read only memory to determine the values of the taper. To this end, when the slope clock is high, the taper counters 166, 170 are inhibited from introducing their contents to adders 160, 162, by the AND gates 172–184. Thus, only the slope counter address and the sine bit are fed to the read only memory 148.

During the slope clock transition from a high to a low, the sine function as produced by the slope counter only is introduced from the read only memory 148 to the registers 198, 200 for storage.

While the slope clock is low, the AND gates 172–184 are enabled to transfer the taper counters 166, 170 into the adders 160, 162, which add the taper counter outputs to the slope counter outputs to produce an address which will produce the sine function for the taper. This sine function is added to the slope sine function in the registers 198, 200, to produce the point on the slope with the taper. Due to the inversion of the most significant bit from the taper counter 170, (via an inverter circuit 214), these sine functions are 180° out of phase. Thus when they are added they produce a zero amplitude output. As the out of phase shift decreases from 180° towards zero phase shift, the combined sine functions produce an amplitude which increases from zero towards maximum, providing a taper.

The process is continuously repeated until the taper counters 166, 170 are advanced 64 times or increments (in this example). At this point, further advances are inhibited; i.e., the output from the taper counter 166 to the inverter 168 goes high, inhibiting the AND gate 164.

At this point, a taper address of zero is added to the slope counter address, which produces two sine functions which are exactly in phase. When the two sine functions are added via taper generator 152, a full or maximum amplitude signal is provided to the holding registers 206, 208.

I claim:

1. A digital sinewave generator for providing an analog sinewave signal comprising the combination of;

master oscillator means for generating a pair of master clocks defined as an interval register (IR) clock and a time period register (TPR) clock;

rate-of-change clock generator means coupled to the IR clock and including first divide logic means for generating a zero carry-out pulse defining a rate-of-change clock;

slope clock generator means coupled to the TPR clock and to said rate-of-change clock, including second divide logic means for generating a zero carry-out pulse defining a slope clock;

digital sine function generator means coupled to the slope clock and including complementary circuit means to produce a digital word representative of a full 360° sinewave corresponding to a cycle of the analog sinewave signal, wherein the instantaneous frequency of the sinewave is dependent upon the rate-of-change clock introduced to the slope clock generator means, and digital to analog means coupled to the digital sine function generator means to generate the analog sinewave signal in response to the digital word.

2. The digital sinewave generator of claim 1 wherein $$\text{Rate-of-change clock} = \frac{\text{IR frequency} \times \text{time} \times \text{resolution}}{\text{range}}$$

wherein range equals $f_1$ (high frequency) $-f_2$ (low frequency) corresponding to the start and stop frequencies, and the IR frequency is a binary number equal to the IR clock rate; and $$\text{Slope clock} = \frac{\text{TPR frequency} \times \text{increments per cycle of sinewave}}{\text{frequency within register 24}}$$

3. The digital sinewave generator of claim 2 wherein the slope clock generator means further comprises, frequency register means having a selected binary number and a clocking rate determined by the rate-of-change clock from the rate-of-change clock generator means;

divide logic means coupled to the frequency register means;

time period register means coupled to the divide logic means and having a selected clocking rate determined by the TPR clock from the master oscillator means;

said divide logic means generating the slope clock in response to the clocking rate of the time period register means and the frequency register means.

4. The digital sinewave generator of claim 3 wherein the digital sine function generator means further comprises;

slope counter means for receiving the slope clock from the slope clock generator means;

slope generator means coupled to the slope counter means and including a read only memory containing the sine function from 0° to 90°, and complementary circuit means to provide a digital word representing the sinewave from 181° through 360°.

5. The digital sinewave generator of claim 4 disposed to generate an analog sinewave signal which sweeps through a selected range of frequencies, wherein the rate-of-change clock generator means provides a varying rate-of-change across the selected range of frequencies for a given time interval and further comprises;

time input means for introducing a binary number corresponding to said given time interval of the sinewave;

range input means for introducing a binary number corresponding to the selected range of frequencies of the sinewave;

divide logic means coupled to the time input means and range input means;

interval register means coupled to the divide logic means and having a selected clocking rate determined by the IR clock from the master oscillator means, said divide logic means and interval register means providing a division of the range into the time of the sweep multiplied by the IR frequency and the resolution;

wherein the divide logic means delivers the rate-of-change clock in response to the clocking rate of the interval register means.

6. The digital sinewave generator of claim 5 wherein the digital sine function generator means further includes taper generating means operatively coupled to the slope counter means and the slope generator means for varying the amplitude between maximum and zero of at least one end of the generated sweep signal delivered from the sine function generator means.

7. The digital sinewave generator of claim 6 wherein the taper generating means further includes taper logic means coupled between the slope counter means and the slope generator means to produce an address which produces a selected sine function for the taper;

wherein the slope counter means provides a slope sine function in response to the slope clock;

a taper generator circuit coupled to the slope generator means to add the slope sine function to the taper sine function;

a slope register means coupled to the taper generator circuit to temporarily store the output; and said digital-to-analog converter means is coupled to the slope register means.

8. The digital sinewave generator of claim 7 wherein the time input means includes a series of digital gates;

said divide logic means includes first adder means coupled to the digital gates, second adder means coupled to said range input means, and flip-flop means coupled to the output of the first adder means;

said interval register means including first and second counter means coupled to the first and second adder means respectively and adapted to subtract the binary number of the range input means to provide a remainder in the interval register means;

wherein the zero carryout pulse defining the rate-of-change clock is introduced to the flip-flop means when the remainder in the first and second counter means is less than the binary number of the range input means, said flip-flop means enabling the digital gates via generation of the rate-of-change clock.

9. The digital sinewave generator of claim 8 further including start frequency means;

wherein the frequency register means includes up/down counter means coupled to the start frequency means, up/down gate means coupled to the rate-of-change clock and thence to the up/down counter means;

said second divide logic means includes third adder means coupled to the up/down counter means and adapted to subtract the binary number in the frequency register means to provide a remainder in the time period register means;

said time period register means includes third counter means coupled to the third adder means;

wherein the carryout pulse corresponding to said slope clock is generated via the third adder means when the remainder in the time period register means is less than the binary number of the frequency register means.

10. The digital sinewave generator of claim 7 wherein the taper logic means includes adder means coupled to the slope counter means;

taper counter means also coupled to the adder means via a series of digital gates, said digital gates being coupled to the slope clock;

said taper generator circuit includes a pair of registers coupled to a pair of respective adders to add the slope and taper sine functions from the slope counter means and the tape counter means;

and the slope register means includes a pair of registers coupled to the pair of adders.

11. A digital sine function generator for generating a full 360° sinewave of selected frequency comprising the combination of;

means for providing an input clock whose rate is the product of the selected frequency times selected increments within the desired sinewave which correspond to the resolution;

counter means disposed to receive the input clock to digitally reference each selected increment at the corresponding intervals of the desired sinewave frequency in response to the input clock;

word generator means coupled to the counter means, including a read only memory containing the sine function from 0° thru 90°;

said word generator means further including complementary circuit means operatively coupled to the read only memory for generating a digital word representative of 181° through 360° of the sinewave from the 0° to 90° sine function retained in the read only memory.

* * * * *